United States Patent
Michalske et al.

(10) Patent No.: US 10,458,372 B2
(45) Date of Patent: Oct. 29, 2019

(54) METHOD AND DEVICE FOR DYNAMIC MONITORING OF AN AIR CHARGING SYSTEM OF AN INTERNAL COMBUSTION ENGINE

(71) Applicant: Robert Bosch GmbH, Stuttgart (DE)

(72) Inventors: Andreas Michalske, Kornwestheim (DE); Frank Mueller, Weil der Stadt (DE); Richard Holberg, Stuttgart (DE); Shuwen Ling, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 15/209,020

(22) Filed: Jul. 13, 2016

(65) Prior Publication Data

US 2017/0022942 A1 Jan. 26, 2017

(30) Foreign Application Priority Data

Jul. 22, 2015 (DE) .................. 10 2015 213 825

(51) Int. Cl.
 *F02M 26/49* (2016.01)
 *F02M 35/10* (2006.01)
(52) U.S. Cl.
 CPC ...... *F02M 26/49* (2016.02); *F02M 35/10157* (2013.01); *Y02T 10/144* (2013.01)

(58) Field of Classification Search
 CPC .................. F02M 26/49; F02M 35/10157
 See application file for complete search history.

(56) References Cited

U.S. PATENT DOCUMENTS

| | | | |
|---|---|---|---|
| 2015/0039256 A1* | 2/2015 | Michalske | .......... F02D 41/1454 702/104 |
| 2015/0047415 A1* | 2/2015 | Michalske | .......... F02D 41/1454 73/23.31 |

FOREIGN PATENT DOCUMENTS

| | | |
|---|---|---|
| DE | 102011088296 A1 | 6/2013 |
| DE | 102012201033 A1 | 7/2013 |

\* cited by examiner

*Primary Examiner* — David M. Gray
*Assistant Examiner* — Andrew V Do
(74) *Attorney, Agent, or Firm* — Norton Rose Fulbright US LLP; Gerard Messina

(57) ABSTRACT

A method and a device for the dynamic monitoring of an air charging system of an internal combustion engine, subsystems of the air charging system having a low-pass characteristic, and a characteristic state quantity that is to be measured being compared with a modeled, identical state quantity. The measured signal and the modeled signal are filtered using a high-pass filter or bandpass filter, and, given a change in the characteristic state quantity that is to be measured, higher-frequency signal portions are evaluated, which is advantageous with regard to the recognition of so-called slow response errors.

15 Claims, 2 Drawing Sheets

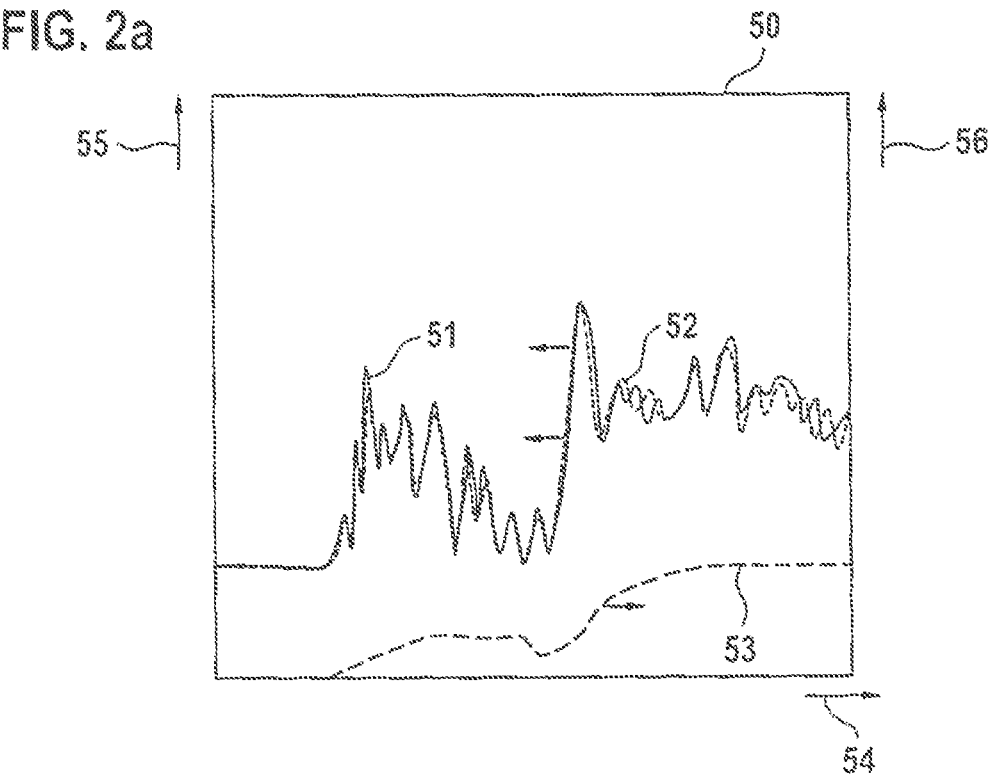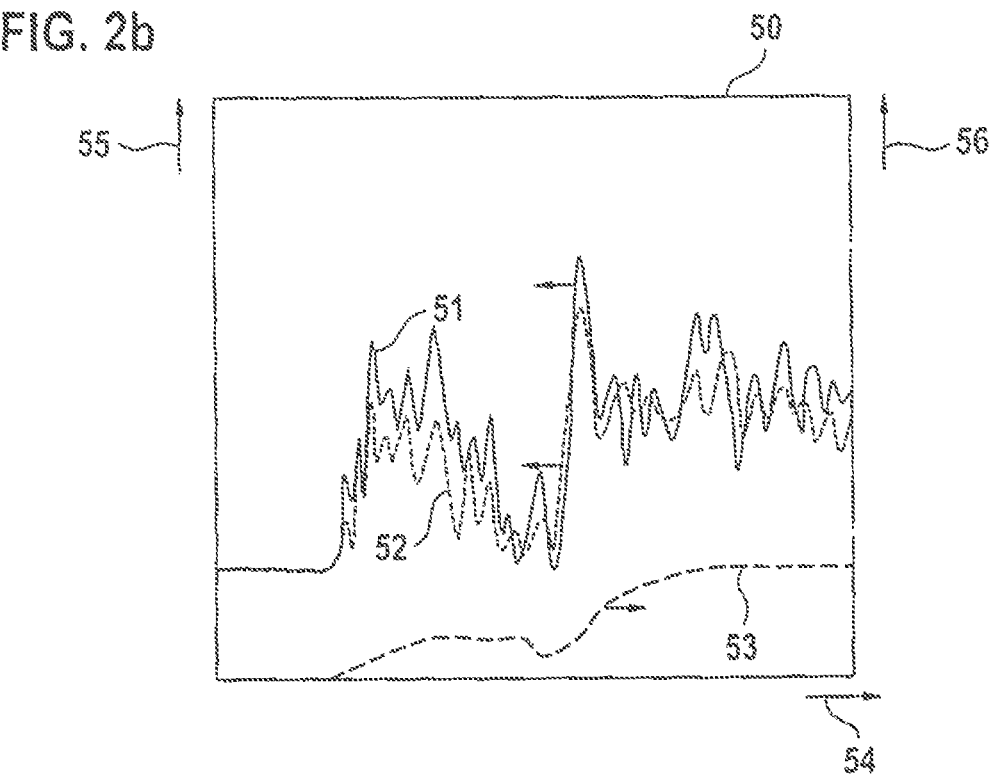

METHOD AND DEVICE FOR DYNAMIC MONITORING OF AN AIR CHARGING SYSTEM OF AN INTERNAL COMBUSTION ENGINE

FIELD OF THE INVENTION

The present invention relates to a method and to a device for the dynamic monitoring of an air charging system of an internal combustion engine, subsystems of the air charging system having a low-pass characteristic as a function of geometry, measurement design, aging, or contamination, and, in the case of a change in a characteristic state quantity that is to be measured, a dynamic diagnosis being carried out on the basis of a comparison of a modeled signal and a measured signal, the measured signal being an actual value of the characteristic state quantity that can be measured directly or calculated from measurement values of other quantities, and the modeled signal being a model value of the characteristic state quantity. In addition, the present invention relates to a device for carrying out the method.

BACKGROUND INFORMATION

Legal regulations concerning on-board diagnosis (OBD) in motor vehicles having an internal combustion engine require the recognition of emission-relevant errors in subsystems of the air charging system. Thus, legislation in California requires monitoring of the exhaust gas recirculation (EGR) in diesel engines and monitoring of the charge pressure regulation in gasoline and diesel engines having chargers, e.g. having exhaust gas turbochargers. European legislation requires the monitoring of the exhaust gas recirculation in diesel engines. In California legislation, inter alia the recognition of so-called slow response errors, relevant to emissions, is required. These are understood as a retarded response of the exhaust gas recirculation, or of the charge pressure, to a change in the target value, which can result in an increase in the exhaust gas emissions, up to values above OBD boundary values.

A retarded response of the exhaust gas recirculation can cause, for example in a diesel engine, an increase in emissions if a temporarily too-low EGR rate results in an increased combustion temperature and an increased oxygen excess, and thus an increase in nitrogen oxide emissions. In contrast, a temporarily too-high EGR rate can result in a reduced combustion temperature and a reduced oxygen excess, and thus an increase in soot emissions. A temporarily too-low or too-high charge pressure can cause disturbances in the air charging of the cylinders, so that the quantity or the time of the fuel injection or the EGR rate is no longer optimally adapted to the actual air charging, which can cause an increase in the exhaust gas emissions.

Various methods exist for the diagnosis of subsystems of the air charging system. For example, methods are known that monitor the intervention of the charging regulation when there is a change in the EGR target value. A stronger intervention of the charging regulation indicates a retarded response of the exhaust gas recirculation. Likewise, methods are known that model the charge pressure under the assumption of an error-free system and compare the model value to the measured charge pressure. If, when there is a change in the charge pressure target value, a large difference is recognized between the model value and the measured value, this is evidence of a retarded response of the charge pressure regulation.

Patent document DE 10 2011 088 296 A1 discusses a method and a device for carrying out the method for dynamic monitoring of gas sensors of an internal combustion engine, the gas sensors having a low-pass characteristic as a function of geometry, measurement design, aging, or contamination, and, given a change in the gas state quantity that is to be measured, a dynamic diagnosis being carried out on the basis of a comparison of a modeled signal and a measured signal, the measured signal being an actual value of an output signal of the gas sensor and the modeled signal being a model value. Here, it is provided that the output signal of the gas sensor is filtered using a high-pass filter, and, when there is a change in the gas state quantity that is to be measured, higher-frequency signal portions are evaluated. With this method, changes with regard to the dynamic behavior in gas sensors can be detected and quantified.

A related method, discussed in DE 10 2012 201 033 A1, can be used to ascertain a dead time of gas sensors.

The approaches discussed in DE 10 2011 088 296 A1 and DE 10 2012 201 033 A1 also offer approaches for providing a dynamic monitoring of an air charging system of an internal combustion engine with corresponding adaptation of the method.

SUMMARY OF THE INVENTION

An object therefore arises of providing, in the context of a further development of DE 10 2011 088 296 A1, a dynamic monitoring of an air charging system that can meet the legal requirements cited above. An object of the present invention is also to provide a corresponding device for carrying out the method.

The object relating to the method is achieved in that the measured signal and the modeled signal are filtered using a high-pass or bandpass filter, and, when there is a change of the characteristic state quantity to be measured, higher-frequency signal portions are evaluated. Subsystems in air charging systems of internal combustion engines have a typical low-pass characteristic that is a function, inter alia, of the geometry of their design. In addition, such systems can change their response characteristic due to aging or external influences. In the time domain, the decreasing limit frequency is expressed as a greater rise time, i.e., given unchanged excitation the signal edges become flatter. Therefore, if for example a suitable high-pass filter, e.g. a first-order high-pass filter, is connected in series with the subsystem to be monitored of the air charging system, then given steep changes in the state quantity to be measured, such as an air mass flow, at the output signal of the high-pass it can be recognized whether the boundary frequency of the low-pass is greater than or smaller than the boundary frequency of the high-pass. If the subsystem reacts slowly as a result of aging or external influences, then when there are changes of the gas state quantities only small, or no, higher-frequency signal portions are still determined. If the system has a high degree of dynamic behavior, this has an effect on a relatively large higher-frequency signal portion, so that with this feature a dynamic diagnosis can be realized. With the method presented here, a uniform dynamic monitoring design can be realized for subsystems of an air charging system. On the one hand, it has a high degree of robustness against disturbances such as statistical fluctuations, but also against possible offsets. On the other hand, the method is distinguished by its low degree of complexity and by low application outlay and resource requirement, such as computing outlay and storage space.

In order to enable a distinction to be made between a slow system and an inadequate excitation, the speed of change of the state quantity to be measured must be assessed without using the signal of the system to be monitored itself. In a method variant, therefore, the higher-frequency signal portions of the measured signal, or of the signal calculable from measurement values of other quantities, are compared to correspondingly filtered and modeled signals, and on the basis of the comparison the dynamic characteristic of the subsystems of the air charging system is inferred.

In a method variant, it is therefore provided that both the higher-frequency signal portions of the measured signal, or of the signal calculable from measurement values of other quantities, and also the filtered and modeled signals are squared and integrated, and in this way higher-frequency energy portions are calculated, and subsequently these energy portions $E_{mod}$ and $E_{meas}$ are set into a ratio, and on the basis of the energy ratio calculated in this way the dynamic characteristic of the subsystems of the air charging system is inferred through comparison with an applicable threshold value. The smaller the surface under the squared output signal of the high-pass is, the slower is the sensor, or the excitation. Alternatively to the signal energies, quantities that are closely associated with the signal energies can also be formed and set into a ratio. For example, instead of the signal energy the root of the signal energy can also be used.

In the special case, when the threshold value for the formed energy ratio $E_{meas}/E_{mod}$ is fallen below, an impermissible dynamic characteristic of the subsystem of the air charging system can be diagnosed. Alternatively, a reciprocal value of the energy ratio can be used for the evaluation.

So that multiplicative errors do not falsify the signal comparison, a norming may be carried out of the respective energy portions. Additive errors do not have an effect, because a high-pass suppresses the direct portion of a signal.

In order to increase the robustness relative to an imprecisely modeled dead time of the modeled signal, it can be provided that in the ascertaining of the signal energies the integration of the higher-frequency signal portions is carried out in integration intervals that are individual for both signals, the time for the start of the integration of the respective signal, given a rising or falling signal edge of the output signal, i.e. of the unfiltered signal, being triggered depending on whether the dynamic behavior is monitored in the positive or the negative direction. In order to ensure that the edges of the measured and of the modeled signal derive from the same excitation, the trigger may be initiated after an applicable phase with constant signals.

In order to recognize, in direction-specific fashion, a retarded response when there is an increase or decrease in the characteristic state quantity, as an extension it can be provided that the energy calculation and formation of the energy ratio is limited to the positive and/or negative portions of the filtered signals. For this purpose, the filtering must be configured such that a rising/falling edge of the unfiltered signal corresponds to a positive/negative portion of the filtered signal.

If it has been ensured that an integration interval includes many edges and is significantly larger than possible dead time errors, the method according to the present invention can then be simplified. It is then alternatively possible to start the integration in the two paths at an arbitrary time and to carry it out for the duration of the integration. The precondition for this is only an adequate excitation due to changes of the state quantity to be measured. Thus, the time interval can include a plurality of falling and rising edges. This method can be applied particularly simply if rising and falling edges of the sensor signal do not have to be monitored separately.

In a method variant, it is provided that the filter time constant of the filter and/or of the threshold value are defined and/or updated or adapted as a function of the subsystem to be monitored of the air charging system. In this way, the dynamic diagnosis can be adapted to system-specific particular features and/or to particular operational phases of the internal combustion engine.

The diagnostic method according to the present invention can be used particularly advantageously in internal combustion engines, e.g. diesel engines, in which, as characteristic state quantity, an exhaust gas recirculation (EGR) mass flow through an exhaust gas recirculation (EGR) valve of the internal combustion engine is monitored, the EGR mass flow being determined through modeling on the one hand and on the other hand being directly measured or calculated from measurement values for an air mass flow in the supply air region of the internal combustion engine, from the rotational speed and from an inlet pressure or charge pressure, and the functioning of the exhaust gas recirculation valve being monitored using the dynamic diagnostic method. In this way, in particular errors of the EGR can be diagnosed early. Also advantageously, the method can be used in the monitoring of the charge pressure regulation in gasoline engines and diesel engines having chargers, for example having exhaust gas turbochargers.

The object relating to the device is achieved in that, in order to carry out the method according to the present invention, a diagnostic unit is provided that has high-pass filters for evaluating higher-frequency signal portions, and at least one calculating unit for the characteristic state quantity determined through modeling, as well as calculating units such as for example integration units, comparators, and, if warranted, characteristic map units for carrying out the dynamic diagnosis, in accordance with the method variants described above. The functionality of the diagnostic unit can here be at least partly software-based; this can be provided as a separate unit or as part of a higher-order engine controlling unit.

In the following, the present invention is explained in more detail on the basis of an exemplary embodiment shown in the Figures.

BRIEF DESCRIPTION OF THE DRAWINGS

FIGS. 2a and 2b respectively show a diagram of the curve for an error-free air charging system and for an air charging system that has a response characteristic retarded by approximately 2 seconds.

DETAILED DESCRIPTION

Figure 1:
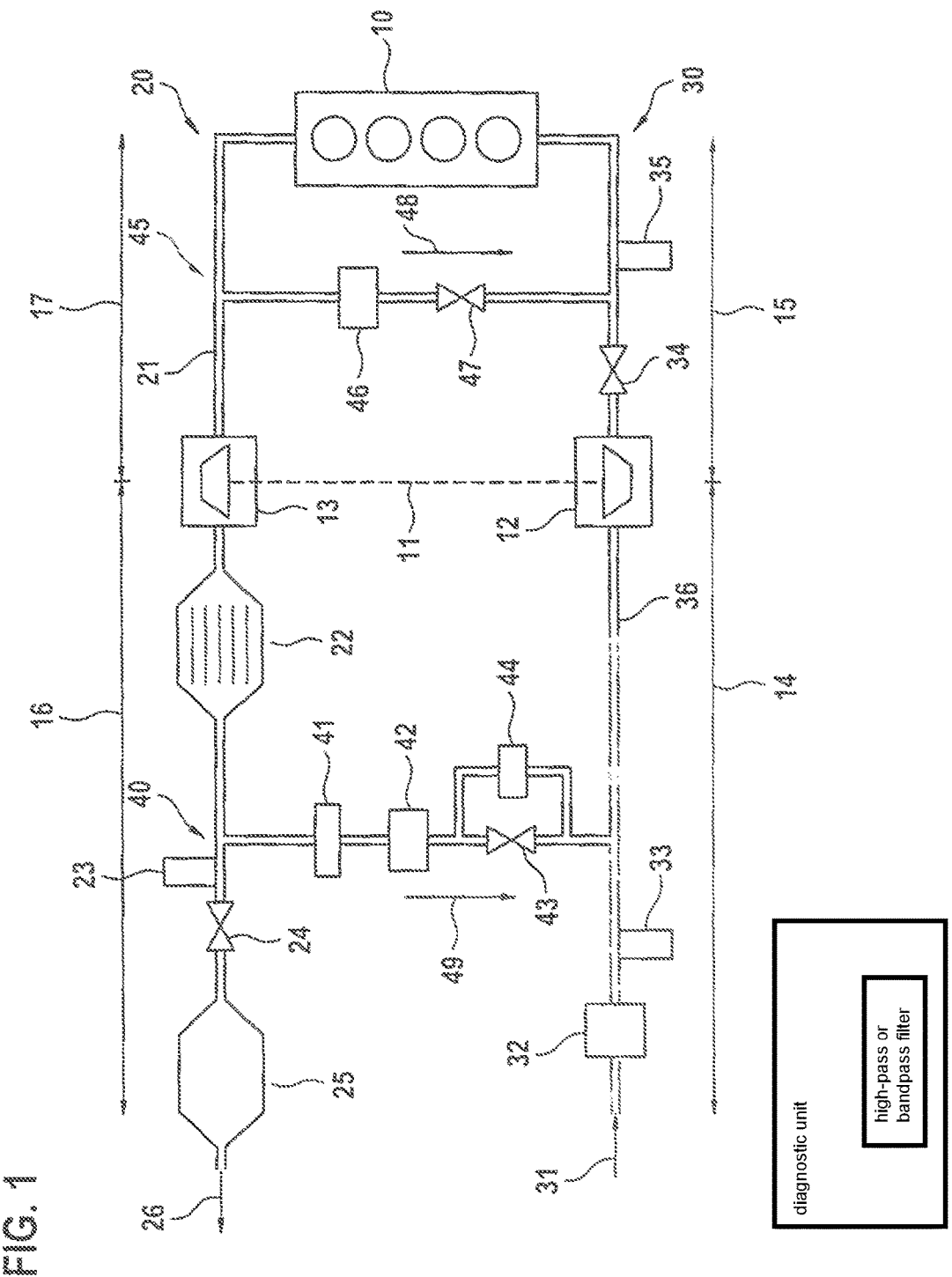
FIG. 1 shows, in a schematic representation, the technical environment in which the method according to the present invention can be used.

FIG. 1 shows, in a schematic representation, the technical environment in which the method according to the present invention can be applied. Shown as an example is an internal combustion engine 10, configured as a diesel engine, having an air supply 30 and an exhaust gas train 20. The representation is limited to the parts essential for the description of the present invention. Along a supply air duct 36 of air supply 30, fresh air 31 is supplied to internal combustion engine 10 via a hot film air mass sensor 32, a compressor 12 of a turbocharger 11, and a fresh air throttle 34. Air supply 30 is subdivided into a supply air low-pressure region 14 before compressor 12, and a supply air high-pressure region 15, in the direction of flow, after compressor 12.

Exhaust gas 26 of internal combustion engine 10 is emitted to the surrounding environment via exhaust gas train 20 from internal combustion engine 10, along an exhaust gas duct 21, via an exhaust gas turbine 13 of turbocharger 12, a particle filter 22, and exhaust gas valve 24, and a muffler 25. Exhaust gas train 20 is subdivided into an exhaust gas high-pressure region 17 and an exhaust gas low-pressure region 16, the exhaust gas low-pressure region 16 beginning after exhaust gas turbine 13 in the direction of flow.

In the depicted example, a low-pressure exhaust gas recirculation line 40 connects exhaust gas low-pressure region 16 after particle filter 22 to supply air low-pressure region 14 after hot film air mass sensor 32. Low-pressure exhaust gas recirculation line 40 contains an exhaust gas filter 41, a first exhaust gas recirculation cooler 42, and a low-pressure exhaust gas recirculation valve 43 having a differential pressure sensor 44 over which a low-pressure exhaust gas recirculation mass flow 49 is conducted. The pressure of the exhaust gas 26 before exhaust gas valve 24 is determined by a first pressure sensor 23. The pressure of fresh air 31 is determined by a second pressure sensor 33 before fresh air throttle 34, and by a third pressure sensor 35 after fresh air throttle 34. Second and third pressure sensor 33, 35 can also be realized, in a different specific embodiment, as a differential pressure sensor.

A high-pressure exhaust gas recirculation line 45 (EGR) connects exhaust gas high-pressure region 17 before exhaust gas turbine 13 to air supply high-pressure region 15 after fresh air throttle 34, via a second exhaust gas recirculation cooler 46 and a high-pressure exhaust gas recirculation valve 47, so that an EGR mass flow 48 can be recirculated.

During operation, the mass of the fresh air 31 supplied to internal combustion engine 10 is determined using hot film air mass sensor 32. Via low-pressure exhaust gas recirculation line 40, fresh air 31 is mixed with a substream of exhaust gas 26. The resulting air mixture is compressed by compressor 12 of turbocharger 11, and subsequently a further substream of exhaust gas 26 is mixed with this air mixture via high-pressure exhaust gas recirculation 45. The resulting mixture is supplied to internal combustion engine 10. The resulting exhaust gas 26 drives turbocharger 11 via exhaust gas turbine 13, and in so doing is relaxed to a lower pressure level. Subsequently, particles are filtered out from exhaust gas 26 by particle filter 22.

In the method according to the present invention, a quantity is modeled that is characteristic for the dynamic behavior of the monitored subsystem. For example, EGR mass flow 48 and/or low-pressure exhaust gas recirculation mass flow 49 is a characteristic quantity for the exhaust gas recirculation. In addition, the quantity has to be measurable, or derivable directly from measurement values. This holds for EGR mass flow 48, which results from the measurement values air mass flow via the throttle valve (fresh air throttle valve 34), rotational speed, and inlet pressure (charge pressure), e.g. in supply air high-pressure region 15.

Through high-pass filtering or bandpass filtering, a frequency portion is extracted from the measured signal and from the modeled signal, each portion having high frequency such that it is already sufficiently attenuated by an emissions-relevant attenuation, for example the region above an angular frequency of 0.5 s$^{-1}$, in which a low-pass having a time constant of 2 seconds or greater already brings about an attenuation to 70% or less. Subsequently, the energy of the filtered signals is determined over a specified time interval by squaring the signals and integrating them.

The energy values of the measured signal and of the modeled signal are compared. If the quotient measured signal/modeled signal is below an applicable threshold, a dynamic error, e.g. a slow response error, is diagnosed.

The present invention has been described with reference to the example of EGR mass flow 48, but can also correspondingly be applied to mass flow 49 of the low-pressure EGR. The EGR mass flow can be modeled well through the following throttle equation:

$$\dot{m}_{mod} = A/(R_{spec} \times T)^{0.5} \psi(p_{ds}/p_{us}, K) p_{us} \quad (1)$$

where $$\psi(x,K) = (Kx^{1/K}(x^{1/K}-x)/(K-1))^{0.5} \quad (2a)$$

for $$(2/(K+1))^{1/(K-1)} < x < 1$$

and $$\psi(x,K) = (2/(K+1))^{1/(K-1)}(K/K+1))^{0.5} \quad (2b)$$

for $$x \leq (2/(K+1))^{1/(K-1)}$$

where
$\dot{m}_{mod}$=modeled EGR mass flow
$p_{us}$=pressure upstream from the EGR valve
$p_{ds}$=pressure downstream from the EGR valve
T=temperature
A=effective cross-section of the EGR valve (function of the controlling)
$R_{spec}$=specific gas constant of the exhaust gas=289 J/(kg K)
K=adiabatic coefficient of the exhaust gas=1.4

The model holds under the assumption of an error-free system. However, if the response of the exhaust gas recirculation is retarded, for example due to wear of EGR valve 47, then the real EGR mass flow is retarded relative to the modeled EGR mass flow $\dot{m}_{mod}$. The real EGR mass flow can be ascertained from the measurement values air mass flow via throttle valve, rotational speed, and inlet pressure (charge pressure).

FIGS. 2a and 2b each show, in a curve diagram 50, the comparison between the modeled and measured EGR mass flow 51, 52. In addition, diagrams 50 show vehicle speed 53. Mass flow 55 and speed 56 are shown as ordinate, and time 54 is shown as abscissa. FIG. 2a shows the behavior in an error-free system. FIG. 2b shows the curve in a system in which the EGR valve has been artificially damped with a time constant of 2 seconds.

A low-pass having a small time constant for noise suppression, and a high-pass having a time constant in the emissions-relevant range (e.g. 2 seconds) is applied to the modeled and to the measured EGR mass flow signal:

Low-Pass:

$$\dot{m}_{lp(n)} = (1-T_s/T_{lp})\dot{m}_{lp(n-1)} + T_s/T_{lp}\dot{m}_{(n)} \quad (3)$$

Subsequent High-Pass:

$$\dot{m}_{hp(n)} = (1-T_s/T_{hp})(\dot{m}_{hp(n-1)} + \dot{m}_{lp(n)} - \dot{m}_{lp(n-1)}) \quad (4)$$

where:
n=n=1, 2, 3, . . . number of the discretization step
$\dot{m}_{(n)}$=unfiltered mass flow
$\dot{m}_{lp(n)}$=low-pass-filtered mass flow
$\dot{m}_{hp(n)}$=low-pass-high-pass-filtered mass flow
$T_s$=discretization interval (time)
$T_{lp}$=low-pass time constant
$T_{hp}$=high-pass time constant The filtered signals are subsequently squared, and are integrated over a specific time interval:

$$E_{mod}[n_{start}, n_{end}] = \text{sum}((\dot{m}_{mod,hp(n)})^2) \quad (5a)$$

from $n = n_{start}$ to $n_{end}$ $$E_{meas}[n_{start}, n_{end}] = \text{sum}((\dot{m}_{meas,hp(n)})^2) \quad (5b)$$

from $n = n_{start}$ to $n_{end}$
where
$[n_{start}, n_{end}]$ = time interval
$\dot{m}_{mod,hp}$ = filtered modeled signal
$\dot{m}_{meas,hp}$ = filtered measured signal
$E_{mod}$ = energy of the filtered modeled signal
$E_{meas}$ = energy of the filtered measured signal In the error-free case, $E_{mod}$ and $E_{meas}$ are approximately equal. If the response of the EGR is retarded, then $E_{meas}$ is smaller than $E_{mod}$. A slow response error can be recognized by comparing the quotient $E_{meas}/E_{mod}$ with a threshold value.

As an alternative to an error-free system, a limited system can be modeled that does not result in exceeding of the emission limits. In general, $E_{meas}$ is then significantly greater than $E_{mod}$. $E_{meas}$ is smaller than $E_{mod}$ only in the case of an errored real system.

In a further embodiment of the method, it is provided that instead of the energy ratio a quantity derived therefrom, for example the reciprocal value, is compared with a threshold value.

In order to recognize a direction-specific retarded response given increase or reduction in the EGR mass flow, the energy formation can be reduced to the positive or negative portions of the filtered signals:

$$E_{mod,pos}[n_{start}, n_{end}] = \text{sum}((\max(0, \dot{m}_{mod,hp(n)}))^2) \quad (6a)$$

from $n = n_{start}$ to $n_{end}$ $$E_{meas,pos}[n_{start}, n_{end}] = \text{sum}((\max(0, \dot{m}_{meas,hp(n)}))^2) \quad (6b)$$

from $n = n_{start}$ to $n_{end}$ $$E_{mod,neg}[n_{start}, n_{end}] = \text{sum}((\min(0, \dot{m}_{mod,hp(n)}))^2) \quad (6c)$$

from $n = n_{start}$ to $n_{end}$ $$E_{meas,neg}[n_{start}, n_{end}] = \text{sum}((\min(0, \dot{m}_{meas,hp(n)}))^2) \quad (6d)$$

from $n = n_{start}$ to $n_{end}$.

What is claimed is:

1. A device for dynamically monitoring an air charging system of an internal combustion engine, subsystems of the air charging system having a low-pass characteristic as a function of geometry, measurement design, aging, or contamination, comprising:
   a diagnostic unit including a computer configured to perform a dynamic diagnostic, given a change in a characteristic state quantity that is to be measured, based on a comparison of a modeled signal and a measured signal, and the measured signal being an actual value of the characteristic state quantity capable of being measured directly or calculable from measurement values of other quantities, and the modeled signal being a model value of the characteristic state quantity; and
   a high-pass or bandpass filter configured to extract higher-frequency signal portions;
   wherein through high-pass filtering or bandpass filtering using the high-pass or bandpass filter, a frequency portion is extracted from the measured signal and from the modeled signal, each of the frequency portions having a high frequency such that it is sufficiently attenuated by an emissions-relevant attenuation, wherein the energy of the filtered signals is determined over a specified time interval by processing the signals, and
   wherein energy values of the measured signal and of the modeled signal are compared, and if the quotient measured signal/modeled signal is below a threshold value, a dynamic error or a slow response error is diagnosed.

2. The device of claim 1, wherein as a characteristic state quantity a low-pressure exhaust gas recirculation mass flow via a low-pressure exhaust gas recirculation valve or an exhaust gas recirculation mass flow via an exhaust gas recirculation valve of the internal combustion engine is monitored, wherein the exhaust gas recirculation mass flow is determined through modeling and is measured directly or calculated from measurement values for an air mass flow in a supply air region of the internal combustion engine, from the rotational speed and from an inlet pressure or charge pressure, and the functioning of the exhaust gas recirculation valve is monitored.

3. The device of claim 1, wherein each of the frequency portions having the high frequency such that it is sufficiently attenuated by an emissions-relevant attenuation, includes a region above an angular frequency of 0.5 s$^{-1}$, in which a low-pass having a time constant of 2 seconds or greater brings about an attenuation to 70% or less, and wherein the energy of the filtered signals is determined over the specified time interval by squaring and integrating the filtered signals.

4. The device of claim 1, wherein each of the frequency portions having the high frequency such that it is sufficiently attenuated by an emissions-relevant attenuation, includes a region above an angular frequency of 0.5 s$^{-1}$, in which a low-pass having a time constant of 2 seconds or greater brings about an attenuation to 70% or less.

5. The device of claim 1, wherein the diagnostic unit is configured to determine the energy of the filtered signals over the specified time interval by squaring and integrating the filtered signals.

6. A method for dynamically monitoring an air charging system of an internal combustion engine, subsystems of the air charging system having a low-pass characteristic as a function of geometry, measurement design, aging, or contamination, the method comprising:
   monitoring a characteristic state quantity of the air charging system;
   performing, for a change in the characteristic state quantity, a dynamic diagnosis by comparison of a modeled signal and a measured signal, the measured signal being an actual value of the characteristic state quantity that can be measured directly or calculated from measurement values of other quantities, and the modeled signal being a model value of the characteristic state quantity, the performing including:
     filtering the measured signal and the modeled signal with one of a high-pass filter or a bandpass filter to extract from each of the measured signal and from the modeled signal a respective high frequency portion that it is attenuated by an emissions-relevant attenuation;
     determining energy values of the filtered measured signal and the filtered modeled signal over a specified time interval;
     comparing the energy values of the filtered measured signal and the filtered modeled signal using a quotient of the energy values of the filtered measured signal and the filtered modeled signal;
     determining the quotient is below a threshold value; and diagnosing a dynamic error or a slow response error based on determining the quotient is below the threshold value.

7. The method as recited in claim 6, wherein the determining of the energy values of the filtered measured signal and the filtered modeled signal includes squaring and integrating the filtered measured signal, and squaring and integrating the filtered modeled signal.

8. The method as recited in claim 7, wherein an integration duration for each of the integrating of the filtered measured signal and the integrating of the filtered modeled signal are individual to each respective one of the filtered measured signal and the filtered modeled signal, a time for a start of the integration of the filtered measured signal being triggered based on a rising or falling signal edge of the measured signal, and wherein a time for a start of the integration of the filtered modeled signal being triggered based on a rising or falling edge of the modeled signal.

9. The method as recited in claim 6, wherein the characteristic state quantity is an exhaust gas recirculation gas flow through an exhaust gas recirculation valve of the internal combustion engine, and wherein the measured signal is directly measured.

10. The method as recited in claim 6, wherein the characteristic state quantity is an exhaust gas recirculation mass flow through an exhaust gas recirculation valve of the internal combustion engine, and wherein the measured signal is calculated from measurement values for an air mass flow in a supply air region of the internal combustion engine, from the rotational speed, and from an inlet pressure or charge pressure.

11. The method as recited in claim 6, wherein energy values are normalized prior to the comparing.

12. The method as recited in claim 6, wherein the filtering includes applying a high-pass filter having a time constant of 2 seconds.

13. The method as recited in claim 12, wherein the filtering includes applying a low-pass filter having a time constant for noise suppression.

14. The method as recited in claim 6, further comprising: outputting a signal indicating the diagnosis of the dynamic error or the slow response error.

15. A device for dynamically monitoring an air charging system of an internal combustion engine, subsystems of the air charging system having a low-pass characteristic as a function of geometry, measurement design, aging, or contamination, the device comprising:
  a diagnostic unit including a computer, the diagnostic unit configured to:
    monitor a characteristic state quantity of the air charging system; and
    perform, for a change in the characteristic state quantity, a dynamic diagnosis by comparison of a modeled signal and a measured signal, the measured signal being an actual value of the characteristic state quantity that can be measured directly or calculated from measurement values of other quantities, and the modeled signal being a model value of the characteristic state quantity, the diagnostic unit being configured to perform the dynamic diagnosis by:
      filtering the measured signal and the modeled signal with a high-pass filter or a bandpass filter to extract from each of the measured signal and from the modeled signal a respective high frequency portion such that it is attenuated by an emissions-relevant attenuation;
      determining energy values of the filtered measured signal and the filtered modeled signal over a specified time interval;
      comparing the energy values of the filtered measured signal and the filtered modeled signal using a quotient of the energy values of the filtered measured signal and the filtered modeled signal;
      determining the quotient is below a threshold value; and
  diagnosing a dynamic error or a slow response error based on determining the quotient is below the threshold value.

* * * * *